W. F. FREIDAG.
BEARING.
APPLICATION FILED NOV. 15, 1912.
1,170,145.    Patented Feb. 1, 1916.
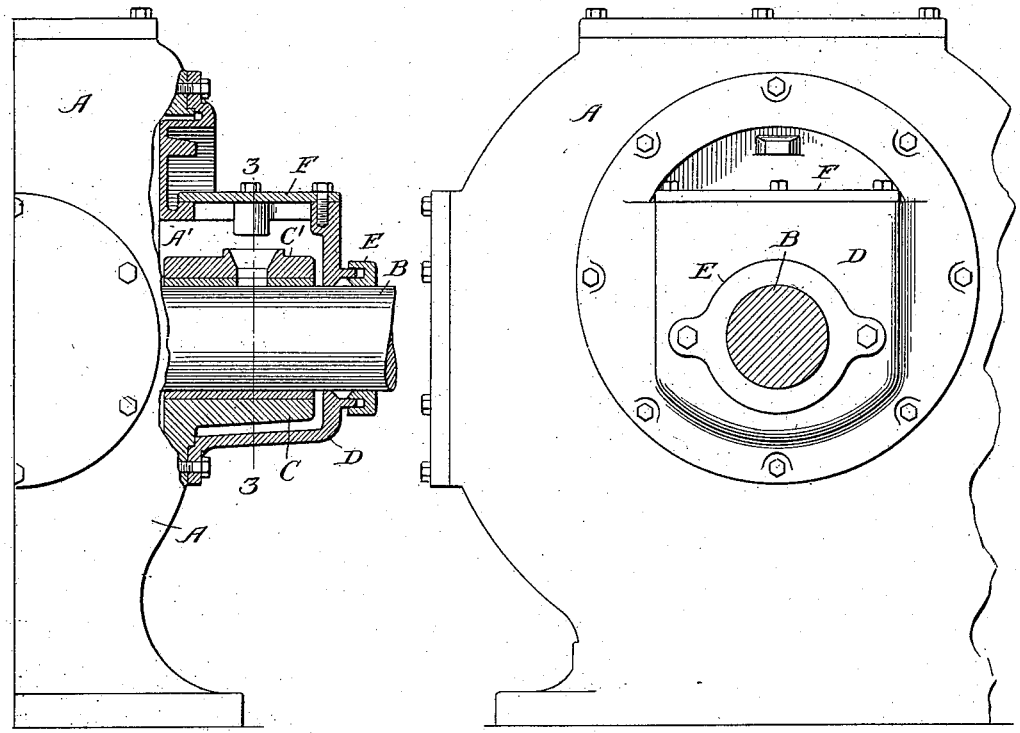
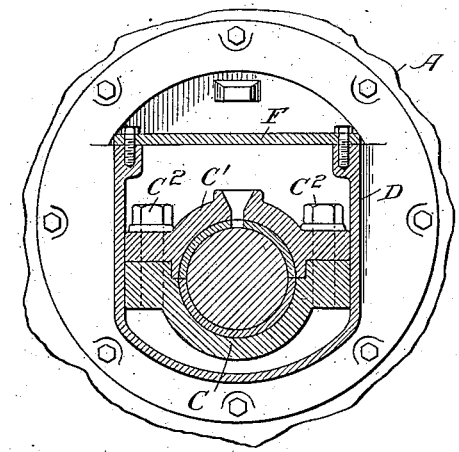
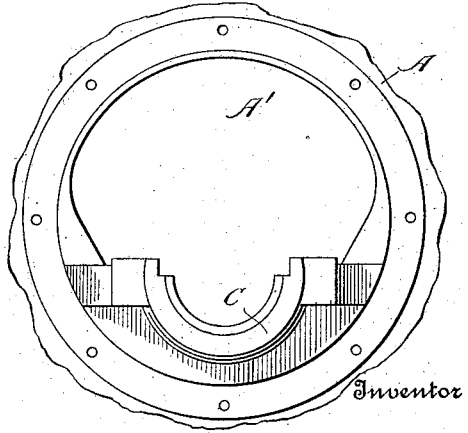
Witnesses
Edwin L. Bradford
Robert Craig Greene
Inventor
William F. Freidag.
By Wallace Greene
Attorney

UNITED STATES PATENT OFFICE.

WILLIAM F. FREIDAG, OF FREEPORT, ILLINOIS, ASSIGNOR TO STOVER ENGINE WORKS, OF FREEPORT, ILLINOIS, A CORPORATION OF ILLINOIS.

BEARING.

1,170,145. Specification of Letters Patent. Patented Feb. 1, 1916.

Application filed November 15, 1912. Serial No. 731,525.

*To all whom it may concern:*

Be it known that I, WILLIAM F. FREIDAG, a citizen of the United States, residing at Freeport, in the county of Stephenson and State of Illinois, have invented certain new and useful Improvements in Bearings, of which the following is a specification, reference being had therein to the accompanying drawing.

The object of this invention is to provide engines using crank-case compression with readily accessible crank shaft bearings, without introducing undesirable conditions or sacrificing compactness, simplicity, or low cost.

In the drawings, Figure 1 is a sectional elevation of a portion of an engine provided with my devices. Fig. 2 is a view of the same devices looking from the right in Fig. 1. Fig. 3 is a section on the line 3—3, Fig. 1. Fig. 4 is a view looking in the same direction as in Fig. 2 showing a portion of the crank-case with removable parts omitted.

As the two sides of the engine are similar, so far as this invention is concerned, only one side is shown.

In the drawings, A represents the crank-case proper of a horizontal reciprocating engine. This case proper has on its opposite sides large openings A', and at the lower side of each opening the integral lower half C of a crank shaft bearing projects outwardly from the case to support a crank shaft B, which is held in place by the upper half C', of the bearing, secured by bolts C². The projecting bearing lies within a supplemental casing D the margin of which surrounds the opening A' and the body of which has in its upper side a large opening normally closed hermetically by a cover plate F secured by bolts or the like. The crank shaft passes through a gland or stuffing box E secured to the outer wall of this casing, and the casing itself is preferably distinct from the crank-case proper against which it is fitted and secured by bolts so that the joint is air tight. The interior of the casing thus forms an externally closed chamber in open communication with the interior of the crank case and large enough to permit ready adjustment and repair of the bearing, in its lower part, when the cover is removed. Obviously, no air, oil nor gaseous material in the crank-case can escape through this chamber, when the engine is running, nor can oil escape when the chamber is opened by removing the cover plate. It is also plain that practically nothing is added to the cost of the engine and that the engine occupies substantially the same space as the same engine without my devices.

What I claim is:

1. The combination with a crank casing having on opposite sides of its body portion extensions forming supplemental external chambers closed below and primarily open above to admit the hands of the operator, of separable shaft bearings projecting from said body into said chambers, respectively, a crank shaft mounted in said bearings, and removable covers adapted to tightly close said chambers above; whereby escape of oil is prevented at all times and the protected bearings are readily accessible for adjustment or repair.

2. The combination with a crank casing provided with a lateral external auxiliary chamber closed below and primarily open upwardly to admit adjustment and removal of bearing parts, of a separable shaft bearing within said chamber, a crank shaft extending from the crank case through said chamber and supported in said bearing, oil arresting devices surrounding the crank shaft at the outer wall of the chamber, and a removable cover tightly closing the chamber above, substantially as and for the purpose set forth.

3. The combination with a crank-shaft casing having integral outwardly projecting shaft bearings and having its walls cut away alongside said bearings to form an open passage from the interior of the casing, of a supplemental, outwardly closed cup-like casing covering said bearings and passages, respectively, hermetically joined to the crank-shaft casing, and provided above the shaft bearings with an openable, hermetically closing cover, permitting ready access to and adjustment of the bearing regardless of liquid which may be within the casings.

In testimony whereof I affix my signature in presence of two witnesses.

WILLIAM F. FREIDAG.

Witnesses:
H. H. ANTRIM,
O. W. DORMAN.

Copies of this patent may be obtained for five cents each, by addressing the "Commissioner of Patents, Washington, D. C."